United States Patent
Yang et al.

(10) Patent No.: US 10,667,094 B2
(45) Date of Patent: May 26, 2020

(54) DEVICE, SYSTEM AND METHOD FOR DETERMINING A PRIORITIZED LIST OF COMMUNICATION GROUPS

(71) Applicant: MOTOROLA SOLUTIONS, INC., Chicago, IL (US)

(72) Inventors: Yunhai Yang, Elgin, IL (US); Daniel J. McDonald, Cary, IL (US); David R. Mills, West Palm Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/001,669

(22) Filed: Jun. 6, 2018

(65) Prior Publication Data

US 2019/0380008 A1    Dec. 12, 2019

(51) Int. Cl.
*H04W 4/08*    (2009.01)
*G06N 20/00*    (2019.01)
(Continued)

(52) U.S. Cl.
CPC .............. *H04W 4/08* (2013.01); *G06N 20/00* (2019.01); *H04M 3/2218* (2013.01); *H04W 4/02* (2013.01)

(58) Field of Classification Search
CPC .............. H04L 12/1822; H04L 47/805; H04L 67/1044; H04W 4/06; H04W 4/08; H04W 4/10; H04W 8/186; H04W 72/10; H04W 76/45; H04W 4/02; H04W 76/36; H04M 3/2218
(Continued)

(56) References Cited

U.S. PATENT DOCUMENTS 6,490,452 B1 * 12/2002 Boscovic .............. H04W 36/30
455/519
6,564,066 B1    5/2003 Biggs et al.
(Continued)

FOREIGN PATENT DOCUMENTS

WO    PCT/US2019/032843    5/2019

OTHER PUBLICATIONS

ISA/EPO, International Search Report and Written Opinion, dated Aug. 21, 2019, re PCT International Patent Application No. PCT/US2019/032843.

*Primary Examiner* — Harun Chowdhury
(74) *Attorney, Agent, or Firm* — Perry + Currier, Inc.

(57) ABSTRACT

A device, system and method for determining a prioritized list of communication groups is provided. A computing device monitors current call statistics of a plurality of communication groups, the communication device assigned to the plurality of communication groups. The computing device, based on a comparison of the current call statistics with historical call statistics of the plurality of communication groups, generates a prioritized list of the plurality of communication groups. The computing device transmits, to the communication device, the prioritized list. The communication device may render the list for selection of a communication group, and/or automatically change to a highest priority communication group of the prioritized list, and/or when bandwidth of a current site is unavailable to communicate on the highest priority communication group, roam to a site with available bandwidth to change to a highest priority communication group in the prioritized list.

18 Claims, 13 Drawing Sheets

(51) Int. Cl.
*H04M 3/22* (2006.01)
*H04W 4/02* (2018.01)

(58) Field of Classification Search
USPC ........ 370/235, 252, 312; 455/11.1, 519, 518
See application file for complete search history.

(56) References Cited

U.S. PATENT DOCUMENTS

| | | |
|---|---|---|
| 2003/0163557 A1 | 8/2003 | Zollner et al. |
| 2008/0003942 A1* | 1/2008 | Namm .................... H04W 4/10 |
| | | 455/11.1 |
| 2010/0214996 A1* | 8/2010 | Santhanam ........... H04W 76/36 |
| | | 370/329 |
| 2012/0064820 A1 | 3/2012 | Bemmel |
| 2013/0172037 A1* | 7/2013 | Govind ................. H04W 8/186 |
| | | 455/518 |
| 2015/0072716 A1 | 3/2015 | Klein |
| 2017/0265045 A1 | 9/2017 | Vladimirovich |
| 2018/0053401 A1 | 2/2018 | Martin et al. |

* cited by examiner

DEVICE, SYSTEM AND METHOD FOR DETERMINING A PRIORITIZED LIST OF COMMUNICATION GROUPS

BACKGROUND OF THE INVENTION

First responders, such as police officers, responding to an incident may attempt to simultaneously and/or manually scan communication groups, such as talkgroups, which may result in flooding of communication group affiliation in a communication system. Such flooding may result in a decrease of available data services in the communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
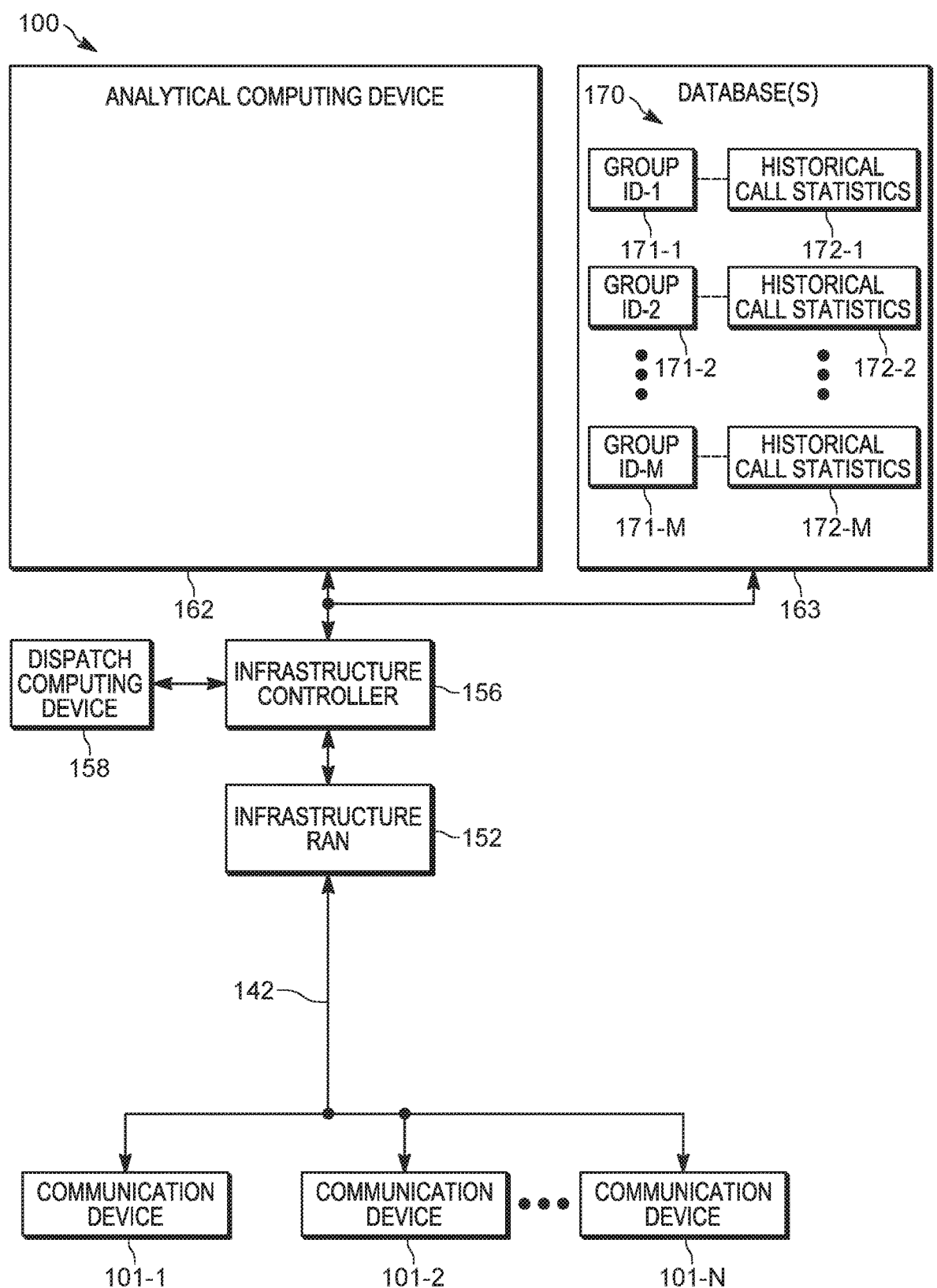
FIG. 1 is a system for determining a prioritized list of communication groups in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a computing device comprising: a communication unit configured to communicate with a communication device assigned to a plurality of communication groups; and a controller communicatively coupled to the communication unit, the controller having access to a memory storing: historical call statistics of the plurality of communication groups; the controller configured to: monitor current call statistics of the plurality of communication groups; based on a comparison of the current call statistics with the historical call statistics, generate a prioritized list of the plurality of communication groups; and, transmit, using the communication unit, to the communication device, the prioritized list.

Another aspect of the specification provides a method comprising: monitoring, at a controller, current call statistics of a plurality of communication groups, a communication device assigned to the plurality of communication groups; based on a comparison of the current call statistics with historical call statistics of the plurality of communication groups, generating, at the controller, a prioritized list of the plurality of communication groups; and, transmitting, from the controller, using a communication unit, to the communication device, the prioritized list.

Another aspect of the specification provides a system comprising: a computing device and a communication device configured to communicate with each other, the computing device configured to: monitor current call statistics of a plurality of communication groups, the communication device assigned to the plurality of communication groups; based on a comparison of the current call statistics with historical call statistics of the plurality of communication groups, generate a prioritized list of the plurality of communication groups; and, transmit, to the communication device, the prioritized list, and the computing device configured to: receive the prioritized list; and one or more of: render the prioritized list for selection of a communication group of the plurality of communication groups; change to a highest priority communication group in the prioritized list; and roam to a site with available bandwidth to change to the highest priority communication group in the prioritized list, when bandwidth of a current site is unavailable to communicate on the highest priority communication group.

Attention is directed to FIG. 1, which depicts a system 100 for determining a prioritized list of communication groups. The system comprises a plurality of communication devices 101-1, 101-2 . . . 101-N, interchangeably referred to hereafter, collectively, as the devices 101 and, generically, as a device 101. The devices 101 are described in more detail below with respect to FIG. 2 and FIG. 3, however each of the devices 101 may comprise a portable mobile device and the like, and/or a fixed communication device. One or more of the devices 101 may be configured for wirelessly communicating over one or more links 142 via a wireless infrastructure radio access network (RAN) 152 (described in more detail below) and via corresponding transceiver circuits. However, one or more of the devices 101 may be configured for wired communication, such as a communication device of a dispatcher.

While in FIG. 1 three communication devices 101 of a number "N" of a plurality of communication devices 101 are depicted, the system 100 may include fewer than three, or more than three devices 101, for example tens, hundreds, or even thousands of devices 101.

Furthermore, the devices 101 are generally configured for communication using communication groups, including, but not limited to, talkgroups, video groups, text groups, and the like. In general, in such communication groups, two or more of the devices 101 may participate in a group communication. For example, two, three, or more of the devices 101 may communicate in such communication groups.

In some examples, each of the devices 101 may be operated by a first responder and furthermore, each of the devices 101 may be associated with a plurality of communication groups. Hence, when incident occurs, such as an emergency and/or a public safety incident, and the like, the operators of the devices 101 may begin to manually switch between the communication groups to find communication groups relevant to the incident in order to affiliate with a communication group. As such, the infrastructure of the system 100 may be flooded with communication group affiliation requests (e.g. requests to communicate on and/or affiliate with, given assigned communication groups), which may lead to an overall reduction of data services in the system 100, at least temporarily.

While one or more of the devices 101 may communicate via wired links, the infrastructure RAN 152 is illustrated in FIG. 1 as providing wireless coverage for the devices 101. In general, the infrastructure RAN 152 communicatively may couple the devices 101 to a single infrastructure controller 156, which in turn is in communication with a dispatch computing device 158, which may include one or more dispatch terminals (not depicted) operated by one or more dispatchers. One or more of the devices 101 may comprise a dispatch terminal of the dispatch computing device 158, and be communicatively coupled to the infrastructure controller 156 (e.g. not via the infrastructure RAN 152). The infrastructure controller 156 further couples the devices 101 to an analytical computing device 162, for example via an internet protocol (IP) network (not depicted, but represented by lines there between), and the like.

The infrastructure RAN 152 may include one or more fixed antennas, fixed terminals, and the like (not depicted) which couple the infrastructure RAN 152 to the infrastructure controller 156 (e.g., a radio controller, call controller, push-to-talk (PTT) server, zone controller, mobility management entity (MME), base station controller (BSC), mobile switching center (MSC) device, site controller, push-to-talk controller, or other network device) the dispatch computing device 158 and the analytical computing device 162. In other embodiments, a plurality of fixed antennas and/or terminals and additional controllers may be disposed to support a larger geographic footprint and/or a larger number of mobile devices (e.g. a larger number of communication devices 101).

The infrastructure controller 156 illustrated in FIG. 1, or some other back-end infrastructure device or combination of back-end infrastructure devices existing on-premises or in a remote cloud compute cluster accessible via an IP network (such as the Internet), may additionally or alternatively operate as a back-end electronic digital assistant, a back-end audio and/or video processing device, and/or a remote cloud-based storage device.

It is understood by a person of skill in the art in FIG. 1 that an IP network is present which couples the infrastructure controller 156 to the analytical computing device 162, as well as one or more databases 163 as described in more detail below. Such an IP network may comprise one or more routers, switches, local area networks (LANs), wireless local area networks (WLANs), wide area networks (WANs), access points, or other network infrastructure, including but not limited to, the public Internet.

The analytical computing device 162 may comprise one computing device, and/or a plurality of computing devices in a cloud compute cluster arrangement, one or more of which may be executing none, all, or a portion of an electronic digital assistant service, sequentially or in parallel, across the one or more computing devices. The one or more computing devices comprising the analytical computing device 162 may be geographically co-located or may be separated by inches, meters, kilometers or miles, and interconnected via electronic and/or optical interconnects. Although not shown in FIG. 1, one or more proxy servers or load balancing servers may control which one or more computing devices perform any part or all of the electronic digital assistant service.

As depicted, the system 100 further comprises the one or more databases 163 accessible to the analytical computing device 162 via an IP network and/or the devices 101, and may include databases such as a long-term video storage database, an offender database (which may include, but is not limited to, facial recognition images to match against), a databases of subjects of interest, a database of candidate subjects, a database of object classifiers, a database of amber alerts, or other types of databases. The databases 163 may further include all or a portion of the databases described herein as being provided at the infrastructure controller 156. Furthermore, one or more of the databases 163 may further store logs of queries to one or more of the databases 163.

The databases 163 may include other types of databases including, but not limited to cartographic database of streets and elevations, a historical or forecasted weather database, a traffic database of historical or current traffic condition. In some example embodiments, the databases 163 may be maintained by third parties (for example, the National Weather Service or a Department of Transportation, respectively).

Furthermore, one or more of the databases 163 may alternatively be referred to as a cloud repository device and/or a cloud repository as data stored at one or more of the databases 163 may be stored "in the cloud".

As shown in FIG. 1, the databases 163 may be communicatively coupled with the analytical computing device 162 and/or the infrastructure RAN 152 (e.g. via an IP network) to allow the analytical computing device 162 and/or the devices 101 to communicate with and retrieve data from the databases 163, for example via an IP network and/or via the infrastructure controller 156. In some example embodiments, the databases 163 are commercial cloud-based storage devices. In some example embodiments, the databases 163 are housed on suitable on-premises database servers. The databases 163 of FIG. 1 are merely examples. In some example embodiments, the system 100 additionally or alternatively includes other databases that store different information. In some example embodiments, the databases 163 disclosed herein and/or additional or other databases are integrated with, or internal to, the infrastructure controller 156. For convenience, the one or more databases 163 are interchangeably referred to hereafter as the database 163.

In particular, as depicted in FIG. 1, the database 163 comprises a memory which stores historical call statistics 170 of a plurality of communication groups. For example, as depicted, the historical call statistics 170 comprises identifiers 171-1, 171-2 . . . 171-M of "M" number of communication groups, interchangeably referred to hereafter, collectively, as the identifiers 171 and, generically, as an identifier 171 (and each labelled as "GROUP ID". Each identifier 171 identifies a respective communication group to which one or more of the devices 101 may be assigned. Each identifier 171 may comprise numerical and/or an alphanumerical alias (e.g. a natural language "name"), and the like.

Furthermore, the historical call statistics 170 further comprise respective historical call statistics 172-1, 172-2 . . . 172-M groups, interchangeably referred to hereafter, collectively, as call statistics 172 and, generically, as a respective set of call statistics 172. The respective call statistics 172 are stored in association with each of the identifiers 171. Associations between data stored at the database 163 is depicted using dotted lines.

In particular, the historical call statistics 170, and/or each respective set of call statistics 172, may comprise one or more of: a call arrival rate; a Push-to-Talk Rate; call duration; Push-To-Talk duration; numbers of respective sites active in each of the plurality of communication groups; numbers of respective zones active in each of the plurality of communication groups; numbers of respective systems active in each of the plurality of communication groups; numbers of respective communication devices 101 active in each of the plurality of communication groups; proximity of the respective communication devices 101 active in each of the plurality of communication groups; priority of users of the respective communication devices 101 active in each of the plurality of communication groups; role of users of the respective communication devices 101 active in each of the plurality of communication groups; and the like.

Indeed, the historical call statistics 170, and/or each respective set of call statistics 172 may store any suitable call statistics for each communication group identified by the identifiers 171.

Sites referred to in the historical call statistics 170, and/or each respective set of call statistics 172 may comprise base stations, and the like of the infrastructure RAN 152. Zones referred to the historical call statistics 170, and/or each respective set of call statistics 172 may comprise zones (e.g. associated with zone controllers), and the like of the infrastructure RAN 152. Systems referred to the historical call statistics 170, and/or each respective set of call statistics 172 may comprise combinations and/or groups of sites and/or zones associated with a given entity, such as a public safety entity, a government entity, and the like; some such entities may connect their respective systems o increase interoperability and/or coverage; hence numbers of respective systems active in each of the plurality of communication groups referred to in the historical call statistics 170 may comprise: numbers of respective combinations of sites and/or numbers of combinations of zones active in each of the plurality of communication groups.

Furthermore, the database 163 may store identifiers of users and/or identifiers the devices 101, as well as associations therebetween (e.g. to indicate the devices 101 that are presently assigned to given users). Furthermore, the database 163 may store roles and/or priorities of users of the devices 101, for example a role and/or rank in a hierarchy, such as an organizational hierarchy, and/or relative priorities of the users. For example, users with higher relative roles and/or ranks may be assigned a higher relative priority than user with lower relative roles and/or ranks (e.g. a captain may be assigned a higher priority than a patrol officer).

Furthermore, the database 163 may store historical locations of the devices 101 at least when communicating on the communication groups identified by the identifiers 171; for example, each of the devices 101 may comprise a respective Global Positioning System (GPS) unit, and the like, and periodically report their current location to a location server (not depicted), which may store the locations in the database 163.

Furthermore, call statistics, in each respective set of call statistics 172 may be time stamped to show a time and/or date of occurrence of a call event and the like.

Furthermore, the call statistics 172 may be updated periodically and/or continuously as communications in the communication groups occur by one or more of the devices 101, the infrastructure controller 156, and/or any other device of the system 100 that may be communicating in the communication groups and/or managing the communication groups.

Figure 2:
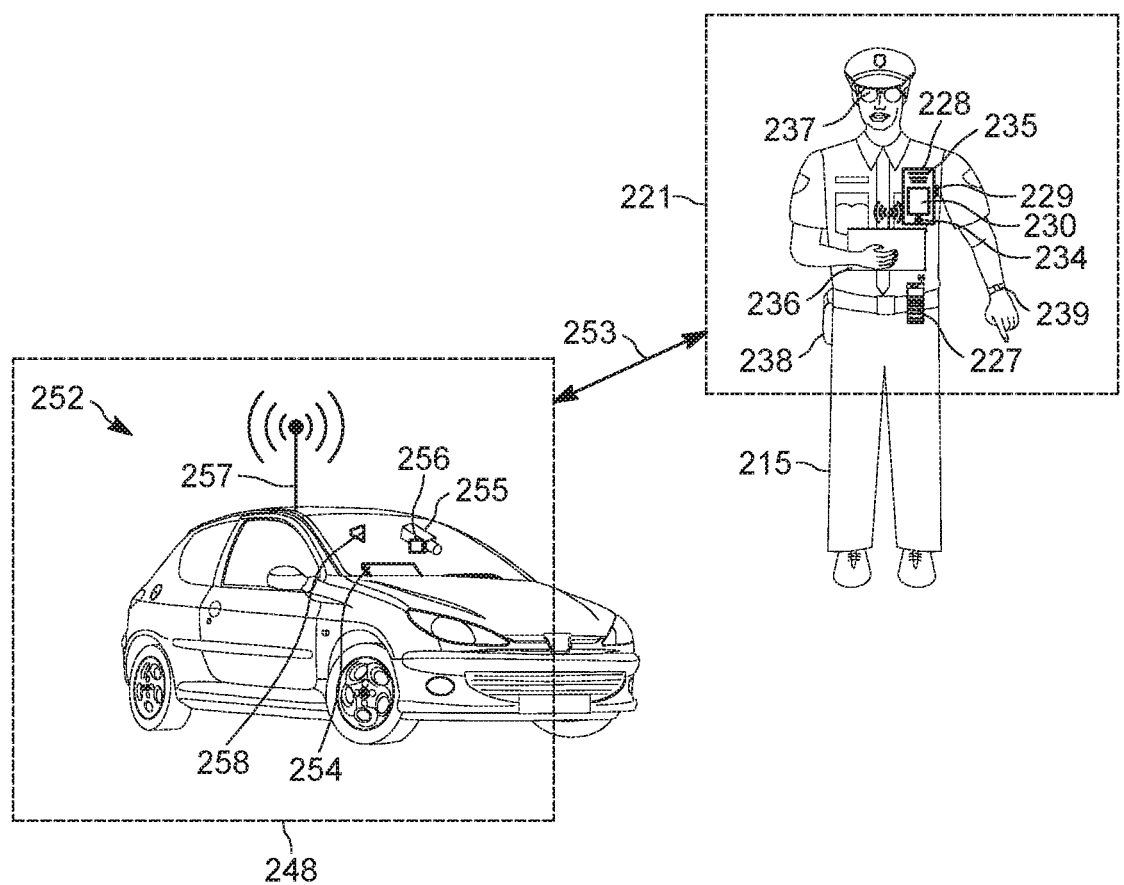
FIG. 2 depicts example communication devices in according with some embodiments.

Attention is next directed to FIG. 2 which depicts example embodiments of the devices 101. As depicted in FIG. 2, a responder 215 (as depicted, a police officer) is operating and/or wearing and/or is associated with a plurality of devices which form a personal area network 221 including, but not limited to: a primary battery-powered portable radio 227, a battery-powered radio speaker microphone (RSM) video capture device 228 (which includes a push-to-talk (PTT) switch 229, a display screen 230 and a video camera 234 and a microphone 235 (which is understood by a person of skill in the art to be a component of a speaker/microphone assembly), a laptop 236 (which may include an integrated video camera and/or microphone and/or speaker and used for data applications such as incident support applications), smart glasses 237 (e.g. which may be virtual reality, augmented reality, or mixed reality glasses and which may include an integrated video camera and/or microphone and/ or speaker), a sensor-enabled holster 238, and/or a biometric sensor wristband 239. While not depicted, the personal area network 221 may include other types of devices that include sensors, such as a sensor equipped vest worn by the responder 215 which may be configured to detect when the vest is impacted and/or pierced.

One or more of the devices 101 may comprise one or more of the devices of the personal area network 221, such as the portable radio 227 which may act as the communication hub for the personal area network 221.

As depicted, the personal area network 221 is in communication with a vehicle area network 248 of a vehicle 252 via a communication link 253, which may be wireless and/or wired as desired. The vehicle 252 is equipped with a plurality of devices which form the vehicle area network 248 including, but not limited to: a mobile communication device 254, a respective vehicular video camera 255 and/or microphone 256, and coupled vehicular transceiver 257, as well as a speaker 258.

Hence, for example, one or more of the devices 101 may have a configuration similar to the devices of the personal area network 221 and/or the vehicle area network 248. Indeed, the devices 101 may include other types of body worn cameras such as head-mounted cameras, other types of vehicular cameras such as roof-mounted cameras, or other types of audio and/or video recording devices.

Although FIG. 1, together with FIG. 2, describes a communication system 100 generally as a public safety communication system that includes responders, such as the responder 215, generally described as a police officer and police vehicles, such as the vehicle 252 generally described as a police car or cruiser, in other embodiments, the communication system 100 may additionally or alternatively be a retail communication system including users that may be employees of a retailer and vehicles that may be vehicles for use by the employees of the retailer in furtherance of the employees' retail duties (e.g., a shuttle or self-balancing scooter). In other embodiments, the communication system 100 may additionally or alternatively be a warehouse communication system including users that may be employees of a warehouse and vehicles that may be vehicles for use by the employees of the warehouse in furtherance of the employees' retail duties (e.g., a forklift). In still further embodiments, the communication system 100 may additionally or alternatively be a private security communication system including responders that may be employees of a private security company and vehicles that may be vehicles for use by the employees of the private security company in furtherance of the private security employees' duties (e.g., a private security vehicle or motorcycle). In even further embodiments, the communication system 100 may additionally or alternatively be a medical communication system including users that may be doctors or nurses of a hospital and vehicles that may be vehicles for used in furtherance of the doctor or nurse's duties (e.g., a medical gurney or ambulance). In still another example embodiment, the communication system 100 may additionally or alternatively be a heavy machinery communication system including users that may be miners, drillers, or extractors at a mine, oil field, or precious metal or gem field and vehicles that may be vehicles used in furtherance of the miners', drillers', or extractors' duties (e.g., an excavator, bulldozer, crane, front loader). As one other example, the communication system 100 may additionally or alternatively be a transportation logistics communication system including users that may be bus drivers or semi-truck drivers at a school or transportation company and vehicles that may uses in furtherance of the drivers' duties.

Figure 3:
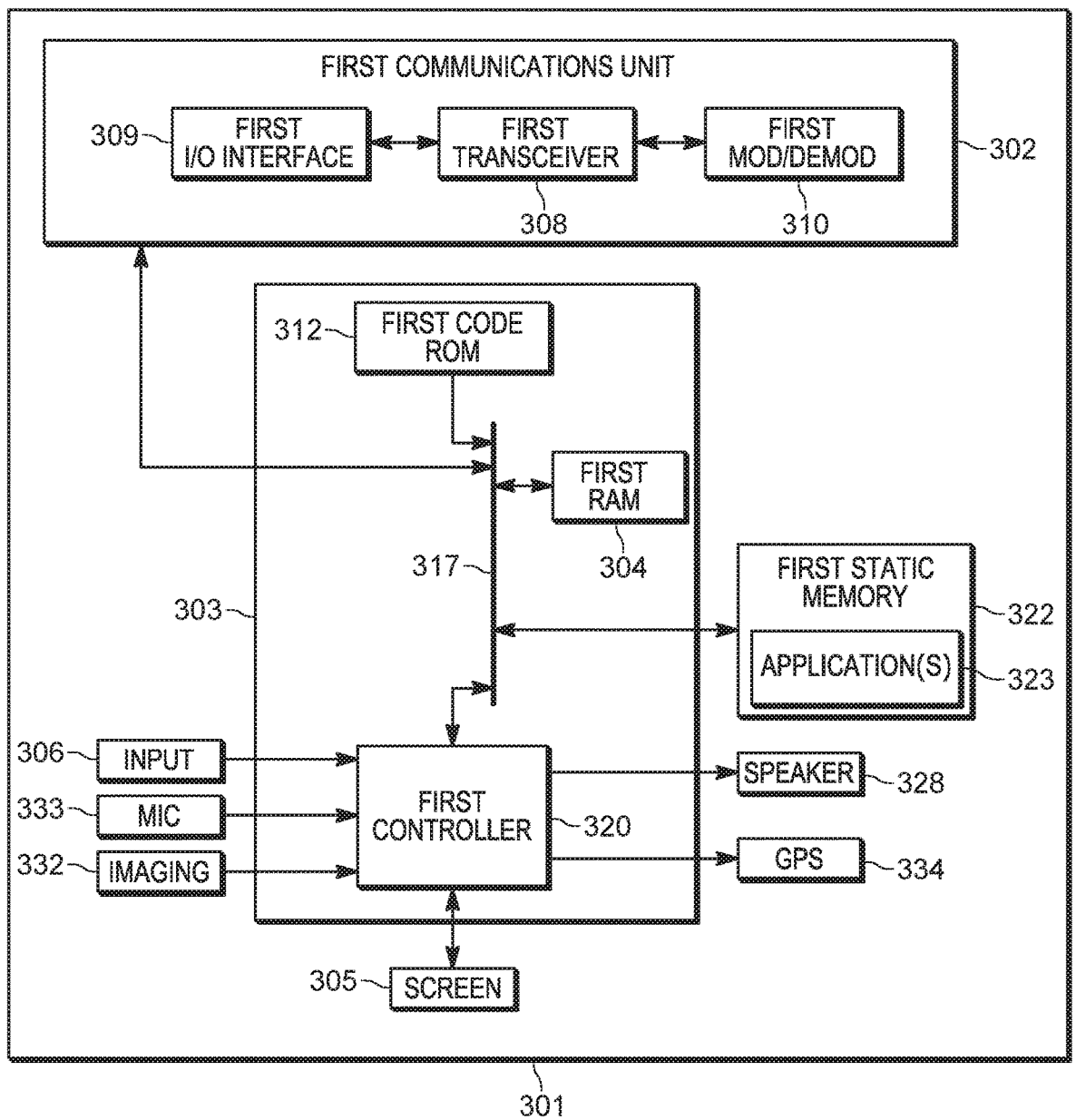
FIG. 3 is a device diagram showing a device structure of an example communication device which may receive a prioritized list of communication groups in accordance with some embodiments.

Attention is next directed to FIG. 3 which sets forth a schematic diagram that illustrates an example communication device 301. One or more of the devices 101 may have a configuration similar to the example communication device 301.

As depicted in FIG. 3, the example communication device 301 generally includes a first communication unit 302, a first processing unit 303, a first Random Access Memory (RAM) 304, a display screen 305, an input device 306, one or more first wireless transceivers 308, one or more first wired and/or wireless input/output (I/O) interfaces 309, a first combined modulator/demodulator 310, a first code Read Only Memory (ROM) 312, a first common data and address bus 317, a first controller 320, a first static memory 322 storing one or more applications 323, a speaker 328, an imaging device 332, a microphone 333 and a GPS unit 334. The one or more applications 323 will be interchangeably referred to hereafter as the application 323, though different applications 323 may be used for different modes of the device 301, as described in further detail below.

However, while the communication device 301 is described with respect to including certain components, it is understood that the communication device 301 may be configured according to the functionality of a specific device.

For example, as depicted, the communication device 301 represents the mobile communication devices 101 described above with respect to FIG. 1, depending on the type of the device 101, the device 301 of FIG. 3 may include fewer or additional components in configurations different from that illustrated in FIG. 3.

For example, the communication device 301 acting as a fixed communication device 101 may not include one or more of the display screen 305, the input device 306, the speaker 328 and the GPS unit 334 and/or one or more of such components may be located external to the device 301. Other combinations are possible as well.

Furthermore, the communication device 301 may be communicatively coupled to other devices for example in the personal area network 221 and/or the vehicle area network 248 of FIG. 2. Hence, for example, one or more of the imaging device 332 of FIG. 3 and the microphone 333 of FIG. 3 may be external to the example communication device 301 of FIG. 3.

The example communication device 301 is described hereafter in further detail. As shown in FIG. 3, the communication device 301 includes the communication unit 302 coupled to the common data and address bus 317 of the processing unit 303. The communication device 301 may also include one or more input devices 306 (e.g., keypad, pointing device, touch-sensitive surface, etc.) and the display screen 305 (which, in some example embodiments, may be a touch screen and thus also act as an input device 306), each coupled to be in communication with the processing unit 303.

The speaker 328 may be present for reproducing audio that is decoded from voice or audio streams of calls received via the communication unit 302 from other portable radios, from digital audio stored at the communication device 301, from other ad-hoc or direct mode devices, and/or from an infrastructure RAN device, or may playback alert tones or other types of pre-recorded audio.

The imaging device 332 may provide video (still or moving images) of an area in a field of view of the communication device 301 for further processing by the processing unit 303 and/or for further transmission by the communication unit 302.

The microphone 333 may be present for capturing audio from a user and/or other environmental or background audio that is further processed by the processing unit 303 and/or is transmitted as voice or audio stream data, or as acoustical environment indications, by the communication unit 302 to other portable radios and/or other communication devices.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory (RAM) 304 and a static memory 322.

The communication unit 302 may include one or more wired and/or wireless input/output (I/O) interfaces 309 that are configurable to communicate with other communication devices, such as others of the devices 101 and/or the dispatch computing device 158 and/or the analytical computing device 162.

For example, the communication unit 302 may include one or more wireless transceivers 308, such as a digital mobile radio (DMR) transceiver, a Project 25 (P25) transceiver, a Bluetooth transceiver, a Wi-Fi transceiver, for example operating in accordance with an IEEE 802.11 standard (e.g., 802.11a, 802.11b, 802.11g), an LTE transceiver, a Worldwide Interoperability for Microwave Access (WiMAX) transceiver, for example operating in accordance with an IEEE 802.16 standard, and/or another similar type of wireless transceiver configurable to communicate via a wireless radio network.

The communication unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some example embodiments, the controller 320 and/or the communication device 301 is not a generic controller and/or a generic device, but a device specifically configured to implement functionality for receiving, and communicating using, a prioritized list of communication groups. For example, in some example embodiments, the communication device 301 and/or the controller 320 specifically comprises a computer executable engine configured to implement specific functionality for receiving, and communicating using, a prioritized list of communication groups.

The static memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 3, programming instructions (e.g., machine readable instructions) that implement the functional teachings of the communication device 301 as described herein are maintained, persistently, at the memory 322 and used by the controller 320 which makes appropriate utilization of volatile storage during the execution of such programming instructions.

In particular, the memory 322 stores instructions corresponding to the application 323 that, when executed by the controller 320, enables the controller 320 to implement functionality for receiving, and communicating using, a prioritized list of communication groups. In illustrated examples, when the controller 320 executes the application 323, the controller 320 is enabled to: receive a prioritized list of communication groups; and one or more of: add the prioritized list to a scan list; automatically render the prioritized list for selection of a communication group of the plurality of communication groups; automatically change to a highest priority communication group in the prioritized list; and automatically roam to a site with available bandwidth to change to a highest priority communication group in the prioritized list, when bandwidth of a current site is unavailable to communicate on the highest priority communication group.

Indeed, the specific action that occurs at the device 301 when the prioritized list is received may depend on a mode of the device 301, which may be selected using a menu system at the device 301, for example using the input device 306. Alternatively, a mode of the device 301 may be permanently and/or at least temporarily configured at the device 301. Alternatively, a system administrator may control the mode of the device 301. Furthermore, different applications 323 may be selected for execution by the controller 320 depending on the mode of the device 301.

Furthermore, the application 323 may be implemented as a component of an electronic digital assistant at least partially implemented by the example communication device 301. For example, a user of by the example communication device 301 may, for example, provide an oral query or statement that is received by the microphone 333 of the by the example communication device 301. The by the example communication device 301 receives signals representative of the oral query or statement from the microphone 333 and analyzes the signals to determine the content of the oral query or statement. For example, the by the example communication device 301 may include a natural language processing (NLP) engine configured to determine the intent and/or content of the oral query or statement. The electronic computing device may also be configured to determine a response to the oral query (for example, by retrieving stored data or by requesting data from a database such as one of the databases 163) and provide the response to an output device of by the example communication device 301 (for example, one or more of the speaker 328 via a generated audio response and the display screen 305 via a generated text based response), or some other action to take in light of the content of the oral query and/or statement. In other words, one or more of by the example communication device 301, embodied in one or more of the communication devices 101 of FIG. 1 and/or FIG. 2, such as the portable radio 227, the infrastructure controller 156, and/or the analytical computing device 162, may include an NLP engine to analyze oral queries and/or statements received by the microphone 333 of the by the example communication device 301 and provide responses to the oral queries and/or take other actions in response to the oral statements.

Furthermore, the specific action that occurs at the device 301 when the prioritized list is received may be implemented as a component of the electronic digital assistant. For example, when the controller 320 receives the prioritized list of communication groups; the electronic digital assistant may: add the prioritized list to a scan list; automatically render the prioritized list for selection of a communication group of the plurality of communication groups; automatically change to a highest priority communication group in the prioritized list; and automatically roam to a site with available bandwidth to change to a highest priority communication group in the prioritized list, when bandwidth of a current site is unavailable to communicate on the highest priority communication group; and the like.

Figure 4:
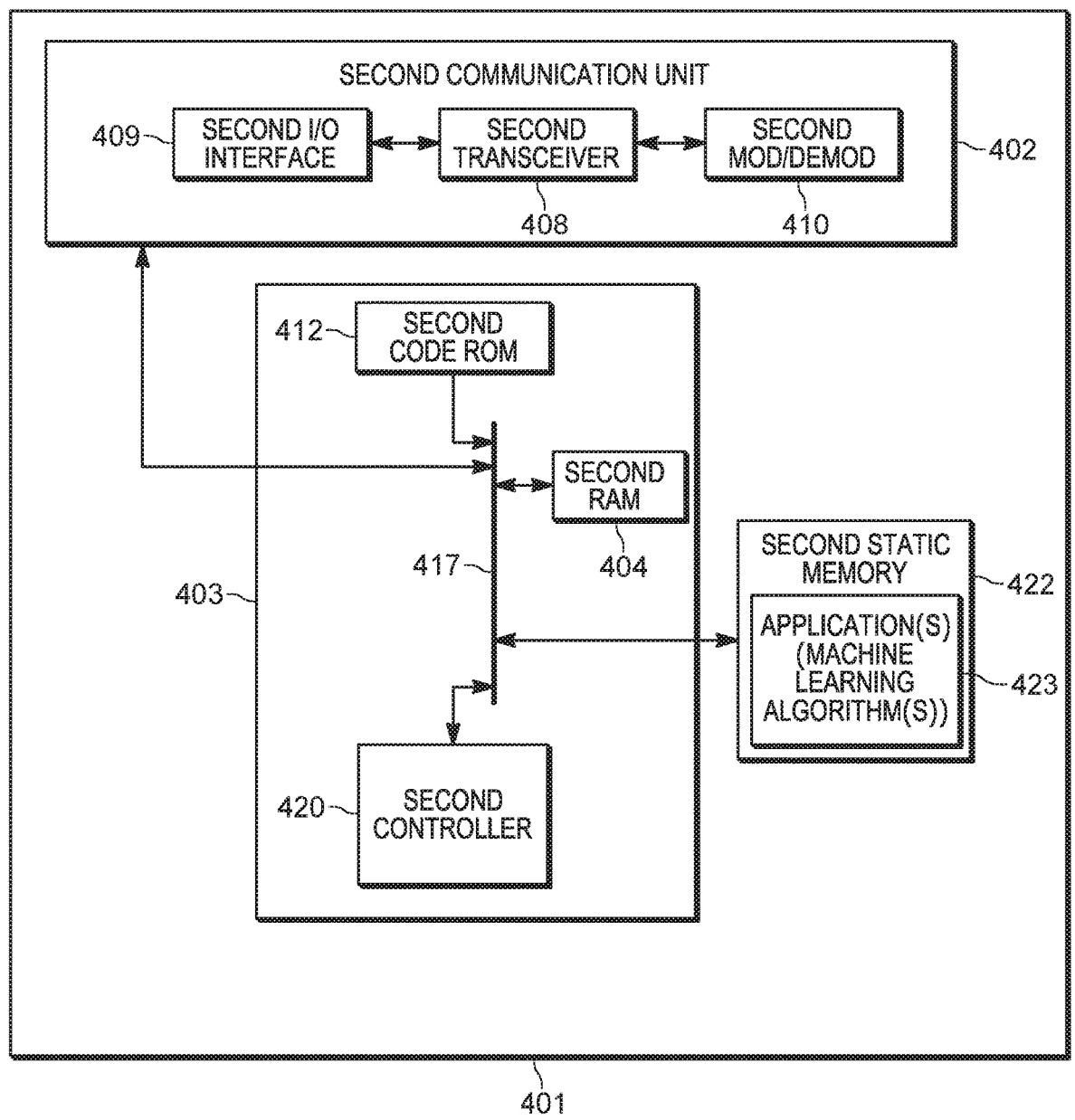
FIG. 4 is a device diagram showing a device structure of a computing device for determining a prioritized list of communication groups in accordance with some embodiments.

Attention is next directed to FIG. 4 which depicts which sets forth a schematic diagram of an example computing device 401 that may include, but is not limited to, one or more of the analytical computing device 162, the infrastructure controller 156, the dispatch computing device 158, and the like. The configuration of the example computing device 401 may generally be similar to the configuration of the example device 301, but adapted for the functionality of a cloud computing device and/or a server device. Furthermore, the functionality of the computing device 401 may be distributed among a plurality of computing devices of the system 100 such as two or more of the analytical computing device 162, the infrastructure controller 156, the dispatch computing device 158, and the like.

Hence, as depicted in FIG. 4, the computing device 401 generally includes a second communication unit 402, a second processing unit 403, a second Random Access Memory (RAM) 404, one or more second wireless transceivers 408, one or more second wired and/or wireless input/output (I/O) interfaces 409, a second combined modulator/demodulator 410, a second code Read Only Memory (ROM) 412, a second common data and address bus 417, a second controller 420, and a second static memory 422 storing one or more applications 423 (which may include machine learning algorithms, and the like). The one or more applications 423 will be interchangeably referred to hereafter as the application 423, though different applications 423 may be used for different modes of the computing device 401. The computing device 401 is described hereafter in further detail.

As shown in FIG. 4, the computing device 401 includes the communication unit 402 coupled to the common data and address bus 417 of the processing unit 403. While not depicted, the computing device 401 may also include one or more input devices (e.g., keypad, pointing device, touch-sensitive surface, etc.) and a display screen (which, in some example embodiments, may be a touch screen and thus also act as an input device), each coupled to be in communication with the processing unit 403. The computing device 401 may also include one or more of speaker and a microphone used for interactions with the computing device 401.

The processing unit 403 may include the code Read Only Memory (ROM) 412 coupled to the common data and address bus 417 for storing data for initializing system components. The processing unit 403 may further include the controller 420 coupled, by the common data and address bus 417, to the Random-Access Memory (RAM) 404 and a static memory 422.

The communication unit 402 may include one or more wired and/or wireless input/output (I/O) interfaces 409 that are configurable to communicate with other communication devices, such as the devices 101.

For example, the communication unit 402 may include one or more wireless transceivers 408, such as a DMR transceiver, a P25 transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communication unit 402 may additionally or alternatively include one or more wireline transceivers 408, such as an Ethernet transceiver, a USB transceiver, or similar transceiver configurable to communicate via a twisted pair wire, a coaxial cable, a fiber-optic link, or a similar physical connection to a wireline network. The transceiver 408 is also coupled to a combined modulator/demodulator 410.

The controller 420 may include ports (e.g. hardware ports) for coupling to other hardware components (e.g. a display screen, an input device, a speaker and/or a microphone, and the like).

The controller 420 includes one or more logic circuits, one or more processors, one or more microprocessors, one or more ASIC (application-specific integrated circuits) and one or more FPGA (field-programmable gate arrays), and/or another electronic device. In some example embodiments, the controller 420 and/or the computing device 401 is not a generic controller and/or a generic device, but a device specifically configured to implement functionality for determining a prioritized list of communication groups. For example, in some example embodiments, the computing device 401 and/or the controller 420 specifically comprises a computer executable engine configured to implement specific functionality for determining a prioritized list of communication groups.

The static memory 422 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 4, programming instructions (e.g., machine readable instructions) that implement the functional teachings of the computing device 401 as described herein are maintained, persistently, at the memory 422 and used by the controller 420 which makes appropriate utilization of volatile storage during the execution of such programming instructions.

In particular, the memory 422 stores instructions corresponding to the application 423 that, when executed by the controller 420, enables the controller 420 to implement functionality for determining a prioritized list of communication groups. In illustrated examples, when the controller 420 executes the application 423, the controller 420 is enabled to: monitor current call statistics of a plurality of communication groups; based on a comparison of the current call statistics with the historical call statistics 170, generate a prioritized list of the plurality of communication groups; and, transmit, using the communication unit, to a communication device 101 assigned to the plurality of communication groups, the prioritized list.

Indeed, the example computing device 401 may generate the prioritized list of the plurality of communication groups, based on a comparison of current call statistics with the historical call statistics 170, using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Baysian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm is within the scope of present implementations.

Hence, the application 423 may include the one or more machine learning algorithms.

Furthermore, different applications 423 may correspond to different machine learning algorithms, and/or different modes of the device 401. For example, different combinations of one or more different machine learning algorithms may be executed depending on a preconfigured and/or selected mode of the device 401.

Similarly, while present embodiments are described with respect to the example computing device 401 generating the prioritized list of the plurality of communication groups, based on a comparison of the current call statistics with the historical call statistics 170, such functionality may be at least partially performed by one or more of the devices 101, the infrastructure controller 156, the dispatch computing device 158, the computing device 401 and/or a combination thereof. In other words, the functionality of the system 100 may be distributed among a plurality of devices of the system 100.

Indeed, such functionality (and/or the application 423) may also be at least partially embodied in the form of the electronic digital assistant, which may be located at one or more of (and/or distributed between one or more of) the device 301, the devices 101, the infrastructure controller 156, the computing device 401 and a combination thereof.

Figure 5:
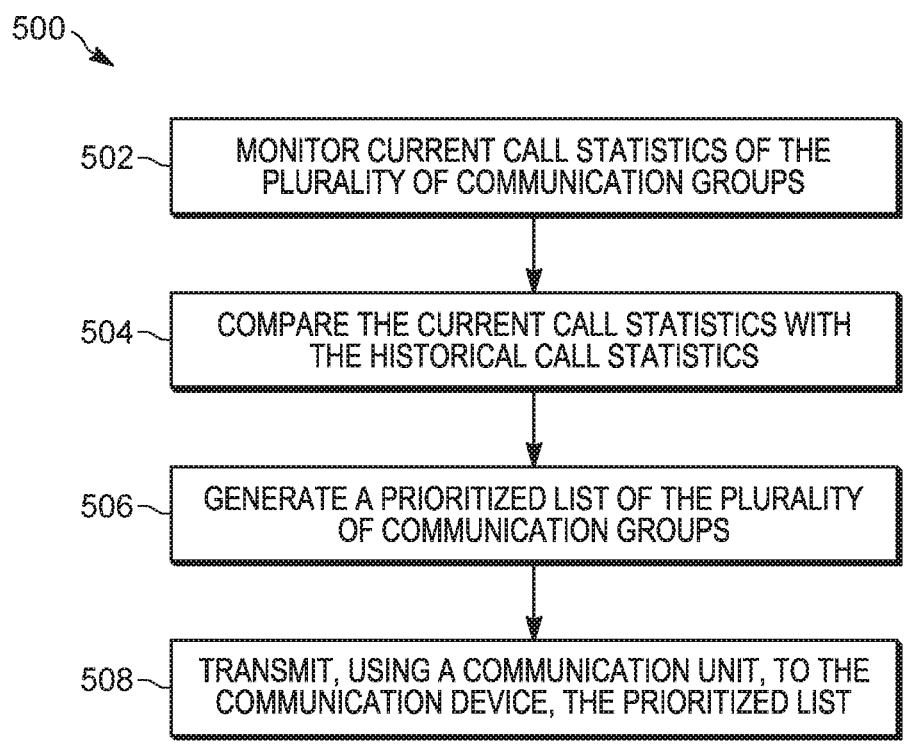
FIG. 5 is a flowchart of a method for determining a prioritized list of communication groups in accordance with some embodiments.

Attention is now directed to FIG. 5 which depicts a flowchart representative of a method 500 for determining a prioritized list of communication groups. The operations of the method 500 of FIG. 5 correspond to machine readable instructions that are executed by, for example, the example computing device 401, and specifically by the controller 420 of the example computing device 401. In the illustrated example, the instructions represented by the blocks of FIG. 5 are stored at the memory 422 for example, as the application 423. The method 500 of FIG. 5 is one way in which the controller 420 and/or the example computing device 401 and/or the system 100 is configured. Furthermore, the following discussion of the method 500 of FIG. 5 will lead to a further understanding of the system 100, and its various components. However, it is to be understood that the method 500 and/or the system 100 may be varied, and need not work exactly as discussed herein in conjunction with each other, and that such variations are within the scope of present embodiments.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well.

Furthermore, while it is understood by a person of skill in the art hereafter that the method 500 is performed at the device 401, the method 500 may be performed at one or more of the devices of the system 100, for example at a combination of the infrastructure controller 156, the dispatch computing device 158, and/or the analytical computing device 162, etc.

At a block 502, the controller 420 of the device 401 monitors current call statistics of the plurality of communication groups. For example, the controller 420 may communicate with one or more of the devices 101, the infrastructure controller 156, the dispatch computing device 158 and/or any other devices in the system 100 that may be communicating on the communication groups and/or managing communications of the communication groups, to determine the current call statistics.

Furthermore, one or more of the computing devices of the system 100 may be configured to update the databases 163 periodically and/or continuously with the current call statistics (e.g. saved in conjunction with the identifiers 171 and/or in the historical call statistics 172, time stamped to show a date and/or time). The controller 420 of the device 401 may monitor the current call statistics of the plurality of communication groups by communicating with the database 163, for example to determine call statistics of each of the communication groups identified by the identifiers 171 for a given time period, for example within a few minutes of a current time. Such a given time period may include a moving time window; when a call statistic for a given communication group is inside the given time period and/or the moving time window, the call statistic may comprise a current respective call statistic for the given communication group; however, when a call statistic of the given communication group is outside the given time period and/or the moving time window, the call statistic may comprise a respective historical call statistic 172 of the given communication group.

At a block 504, the controller 420 of the device 401 compares the current call statistics with the historical call statistics 172.

At a block 506, the controller 420 of the device 401, based on the comparison of the current call statistics with the historical call statistics, generates a prioritized list of the plurality of communication groups. The comparison of the current call statistics with the historical call statistics 172 and the generation of the prioritized list of the plurality of communication groups may occur using the machine learning algorithms of the application 423.

For example, when a call rate and/or a Push-To-Talk rate and/or a call duration and/or a Push-To-Talk duration of a communication group increases, as compared to historical call rates and/or durations, etc., the priority of that communication group may increase and be assigned a higher position in the prioritized list than communication groups where call rates and/or durations have not increased as compared to historical call rates and/or durations, etc.

Similarly, when numbers of respective sites and/or zones and/or systems and/or communication devices 101 active in a communication group increase, as compared to historical numbers of active sites and/or zones and/or systems and/or communication devices 101, etc., the priority of that communication group may increase and be assigned a higher position in the prioritized list than communication groups where numbers of respective sites and/or zones and/or systems and/or communication devices 101 active in a communication group do not increase.

Similarly, when numbers of users of a higher relative priority and/or role that are active in a communication group increase, as compared to historical numbers of active users of that priority and/or role, the priority of that communication group may increase and be assigned a higher position in the prioritized list than communication groups where numbers of users of the higher relative priority and/or role do not increase.

Similarly, when proximity of, and/or distance between, devices 101 of a communication group decrease (e.g. the devices 101 are within a given distance of each other and/or within a given area which may be associated with an incident), as compared to historical proximity of the devices 101, the priority of that communication group may increase and be assigned a higher position in the prioritized list than communication groups where proximity of devices 101 do not decrease.

Furthermore, the prioritized list may be further based on feedback of previous implementations of the method 500, such feedback being used by the machine learning algorithms to "teach" the example computing device 401 to better generate the prioritized list and/or to better implement the method 500.

The prioritized list of the plurality of communication groups may generally be in an order of priority, and a highest priority communication group may be first in the prioritized list and a lowest priority communication group may be last in the prioritized list, however any scheme for indicating priority in the prioritized list of the plurality of communication groups is within the scope of the present specification.

Each communication group in the prioritized list may be represented by a respective identifier 171, which may be numerical and/or an alphanumerical alias (e.g. a natural language "name").

At a block 506, the controller 420 of the device 401, transmits, using the communication unit 402, to a communication device 101, the prioritized list.

It is furthermore understood by persons of skill in the art that the controller 420 of the device 401 may generate and transmit a prioritized list of the plurality of communication groups for each communication device 101, and that a respective plurality of communication groups may be the same or different for each of the communication devices 101 (e.g. each of the communication devices 101 may be assigned to different subsets of the plurality of communication groups). Similarly, a respective prioritized list of the plurality of communication groups may be the same or different for each of the communication devices 101.

Figure 6:
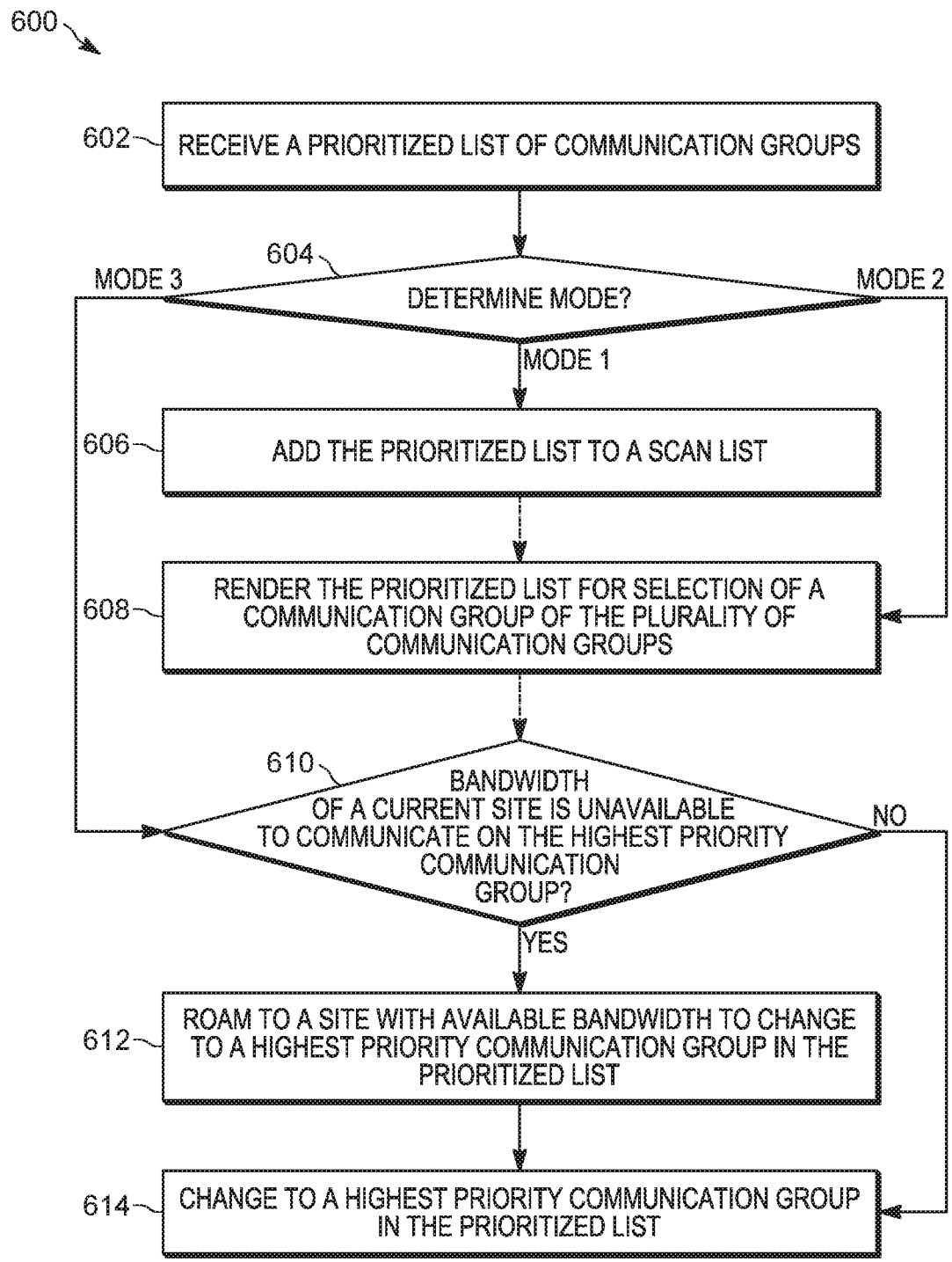
FIG. 6 is a flowchart of a method for receiving, and communicating using, a prioritized list of communication groups in accordance with some embodiments.

Attention is now directed to FIG. 6 which depicts a flowchart representative of a method 600 for receiving, and communicating using, a prioritized list of communication groups. The operations of the method 600 of FIG. 6 correspond to machine readable instructions that are executed by, for example, the example communication device 301, and specifically by the controller 320 of the example communication device 301. In the illustrated example, the instructions represented by the blocks of FIG. 6 are stored at the memory 322 for example, as the application 323. The method 600 of FIG. 6 is one way in which the controller 320 and/or the example communication device 301 and/or the system 100 is configured. Furthermore, the following discussion of the method 600 of FIG. 6 will lead to a further understanding of the system 100, and its various components. However, it is to be understood that the method 600 and/or the system 100 may be varied, and need not work exactly as discussed herein in conjunction with each other, and that such variations are within the scope of present embodiments.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 100 of FIG. 1, as well.

Furthermore, while it is understood by a person of skill in the art hereafter that the method 600 is performed at the device 301, the method 600 may be performed at one or more of the communication devices 101 of the system 100.

Furthermore, dashed arrows connecting blocks of the method 600 indicate optional modes of the method 600. For example, the blocks connected by dashed arrows may be performed in conjunction with each other, in any suitable order, however individual blocks connected by dashed arrows may also be implemented without performing others of the connected blocks.

At a block 602, the controller 320 of the example communication device 301 receives a prioritized list of communication groups, for example, from the example computing device 401 as generated at the block 506 of the method 500 and transmitted at the block 508 of the method 500.

As described above the example communication device 301 may operate in different modes, or the example communication device 301 may operate in one pre-configured mode. When the example communication device 301 operates in different modes, at a block 604, the controller 320 of the example communication device 301 determines the mode in which the example communication device 301 is operating.

In a first mode ("MODE 1" at the block 604), at a block 606, the controller 320 of the example communication device 301 adds the prioritized list to a scan list. Hence, the communication unit 302 may be controlled to scan the communication groups in the prioritized list, for example in an order of priority, starting at a first communication group in the prioritized list (e.g. the highest priority communication group) and ending at a last communication group in the prioritized list.

In a second mode ("MODE 2" at the block 604), at a block 608, the controller 320 of the example communication device 301 automatically renders the prioritized list for selection of a communication group of the plurality of communication groups. For example, the prioritized list may be rendered at the display screen 305 with each of the plurality of communication groups being rendered as a selectable option at the display screen 305, such that when a given communication group is selected, the communication unit 302 is controlled to communicate on the given communication group and/or to request affiliation with the given communication group.

In some example embodiments and/or alternative modes, the controller 320 of the example communication device 301 may perform both the block 606 and the block 608 as indicated by the dashed arrow therebetween and/or either of the block 606 and the block 608 may be performed without performing the other block.

In a third mode ("MODE 3" at the block 604), at a block 608, the controller 320 of the example communication device 301 determines whether bandwidth of a current site is unavailable to communicate on a highest priority communication group in the prioritized list.

When the bandwidth of the current site is unavailable to communicate on the highest priority communication group in the prioritized list (e.g. a "YES" decision at the block 610), at a block 612, the controller 320 of the example communication device 301 automatically roams to a site with available bandwidth and, at a block 614, the controller 320 of the example communication device 301 changes to the highest priority communication group in the prioritized list using the site with the available bandwidth and/or requests affiliation with the given communication group using the site with the available bandwidth.

Otherwise (e.g. a "NO" decision at the block 610), at a block 614, the controller 320 of the example communication device 301 changes to the highest priority communication group in the prioritized list using the current site and/or requests affiliation with the given communication group using the site with the available bandwidth.

However, in some example embodiments, the controller 320 of the example communication device 301 may perform one or more of the block 606, the block 608, the block 610, the block 612 and the block 614, for example by one or more of adding a prioritized list to the scan list, rendering the prioritized list, and changing to a highest priority communication group (with or without roaming). Hence, in some example embodiments and/or alternative modes, the controller 320 of the example communication device 301 may perform all of the block 606, the block 608, the block 610, and one of the blocks 612, 614, as indicated by the dashed arrows therebetween and/or either of the block 606, the block 608, the block 612 in combination with one of the blocks 612, 614, may be performed without performing the other block.

Attention is next directed to FIG. 7 to FIG. 13 which depicts examples of the method 500 and the method 600. In FIG. 7 to FIG. 13, the method 500 is described as being implemented at the analytical computing device 162 (e.g. the example computing device 401, in these examples, includes the analytical computing device 162), while the method 600 is described as being implemented at the devices 101 (e.g. the example communication device 301, in these examples, includes one or more of the devices 101).

Figure 7:
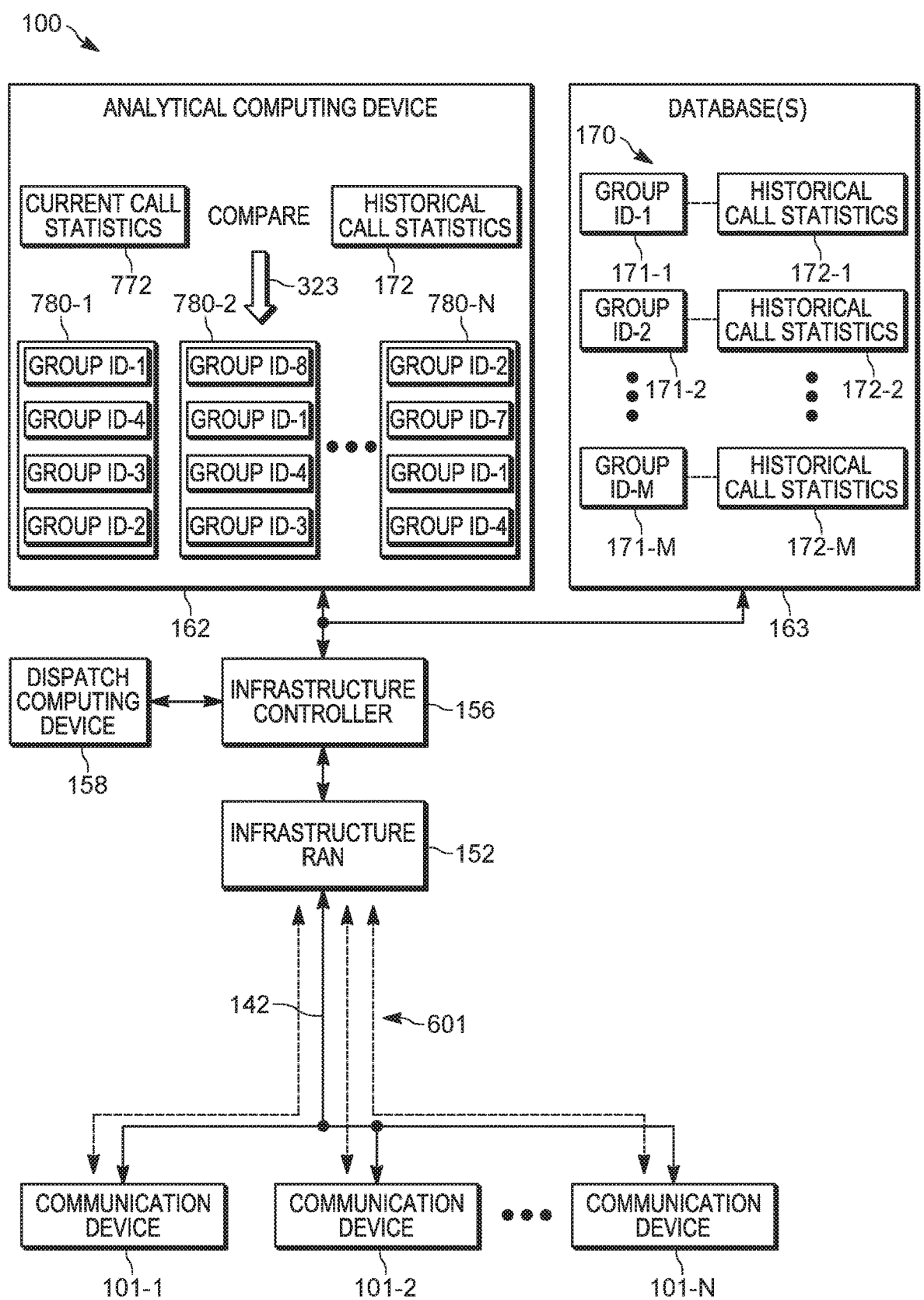
FIG. 7 depicts the system of FIG. 1 implementing a method for determining a prioritized list of communication groups in accordance with some embodiments.

Attention is next directed to FIG. 7 which is substantially similar to FIG. 1 with like elements having like numbers. In FIG. 7, the devices 101 are depicted as communicating on current calls 601, for example on communication groups; specifically, the current calls 601 are performed via the infrastructure RAN 152, the infrastructure controller 156 and further may be between the devices 101 and/or between the devices 101 and the dispatch computing device 158. Current call statistics 772 for the calls are determined, for example by one or more of the analytical computing device 162, the infrastructure RAN 152, the infrastructure controller 156, the dispatch computing device 158, and the like, and the current call statistics 772 may be stored in the database 163.

The analytical computing device 162 monitors (e.g. at the block 502 of the method 500) the current call statistics 772 and compares (e.g. at the block 504 of the method 500) the current call statistics 772 with the historical call statistics 172. As depicted, the analytical computing device 162 generates (e.g. at the block 506 of the method 500) prioritized lists 780-1, 780-2 . . . 780-N (interchangeably referred to hereafter, collectively, as the prioritized lists 780 and, generically, as a prioritized list 780), using the application 323, and based on the comparison of the current call statistics 772 with the historical call statistics 172. As depicted, the analytical computing device 162 generates a respective prioritized list 780 for each communication device 101.

As depicted, the prioritized list 780-1 for the communication device 101-1 includes four communication group identifiers (e.g. selected from the identifiers 171) "GROUP ID-1", "GROUP ID-4", "GROUP ID-3", "GROUP ID-2" which may be numerical identifiers and/or aliases. Regardless of format each of the communication group identifiers in the prioritized list 780-1 enable the communication device 101-1 to change to a respective communication group identified by a communication group identifier and/or to request affiliation with a respective communication group identified by a communication group identifier.

The prioritized list 780 for each of the communication devices 101 are similar to the prioritized list 780-1 include different communication group identifiers, depending, for example, on communication groups to which each of the communication devices 101 are assigned, a user of each device 101 (e.g. communication group priorities may depend on a role and/or priority, and the like, of a user of a device 101 as well as roles and/or priorities of users of devices 101 communicating in the communication groups). As depicted, the prioritized list 780-2 for the communication device 101-2 includes communication group identifiers "GROUP ID-8", "GROUP ID-1", "GROUP ID-4", "GROUP ID-3", and the prioritized list 780-N for the communication device 101-N includes communication group identifiers "GROUP ID-2", "GROUP ID-7", "GROUP ID-1", "GROUP ID-4". The communication group identifiers in each of the prioritized lists 780 are further listed in an order of priority, with the first communication group identifier having the highest priority and the last communication group identifier having the lowest priority, from top to bottom in FIG. 7.

Furthermore, each of the prioritized lists 780 include four communication group identifiers, however, the prioritized lists may include as few as one communication group identifier and as many respective group identifiers with which a respective communication device 101 is associated. Indeed, the communication group identifiers in a prioritized list 780 may be configurable (e.g. at the analytical computing device 162 and/or the example computing device 401 and/or a respective communication device 101), and may be the same or different for each of the communication devices 101.

Figure 8:
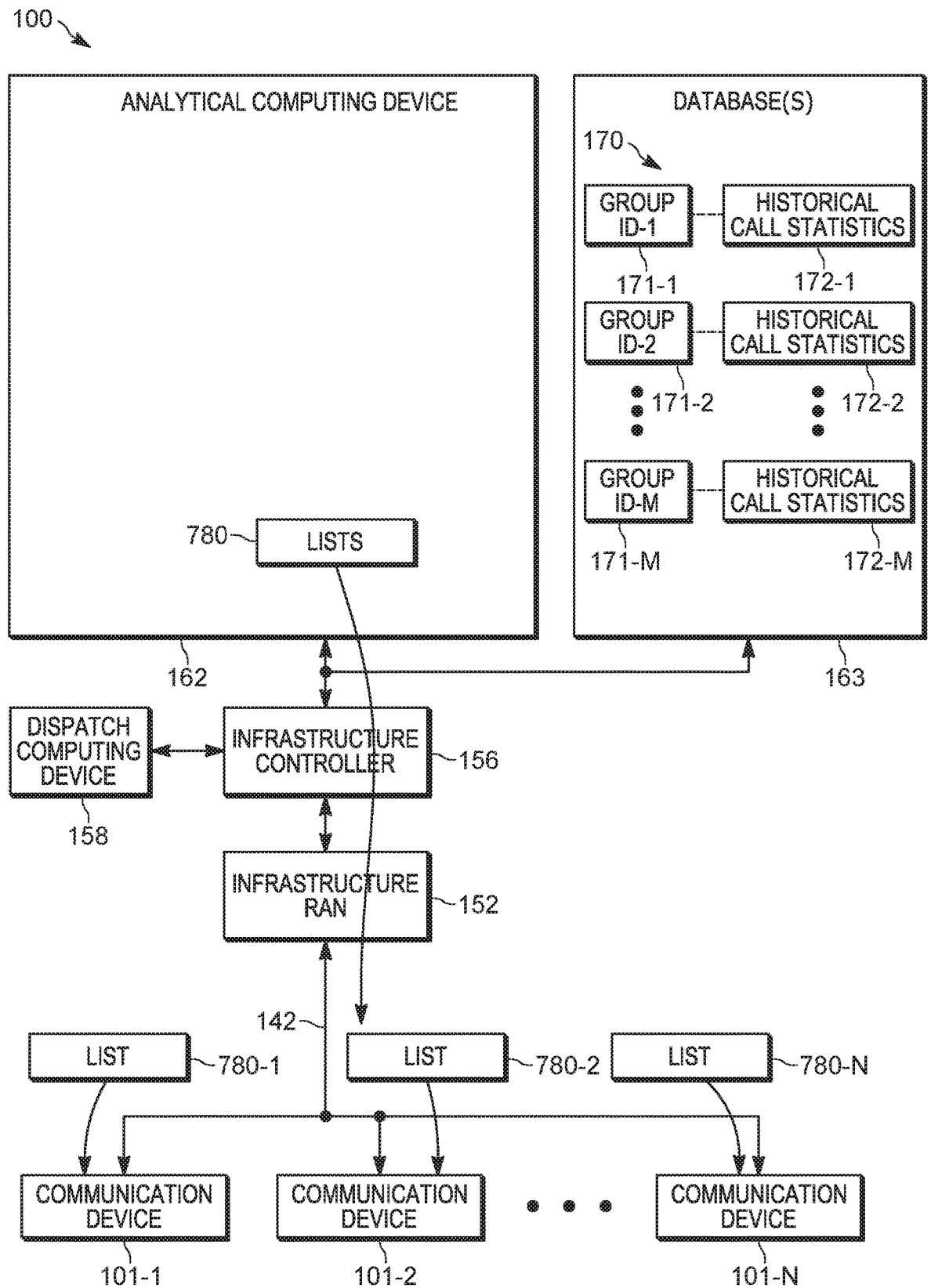
FIG. 8 depicts a computing device of the system of FIG. 1 transmitting respective prioritized lists of communication groups to communication devices in accordance with some embodiments.

Attention is next directed to FIG. 8 which is substantially similar to FIG. 7 with like elements having like numbers. In FIG. 8, the analytical computing device 162 is transmitting (e.g. at the block 508 of the method 500) the prioritized lists 780 to each of the communication devices 101. Specifically, the prioritized list 780-1 is transmitted to the communication device 101-1, the prioritized list 780-2 is transmitted to the communication device 101-2, and the prioritized list 780-N is transmitted to the communication device 101-N. The communication devices 101 receive (e.g. at the block 602 of the method 600) the respective prioritized lists 780. Furthermore, such transmitting of the prioritized lists 780 to the communication devices 101 may include, but is not limited to, unicasting, multicasting, and/or broadcasting the prioritized lists 780 to the communication devices 101.

Figure 9:
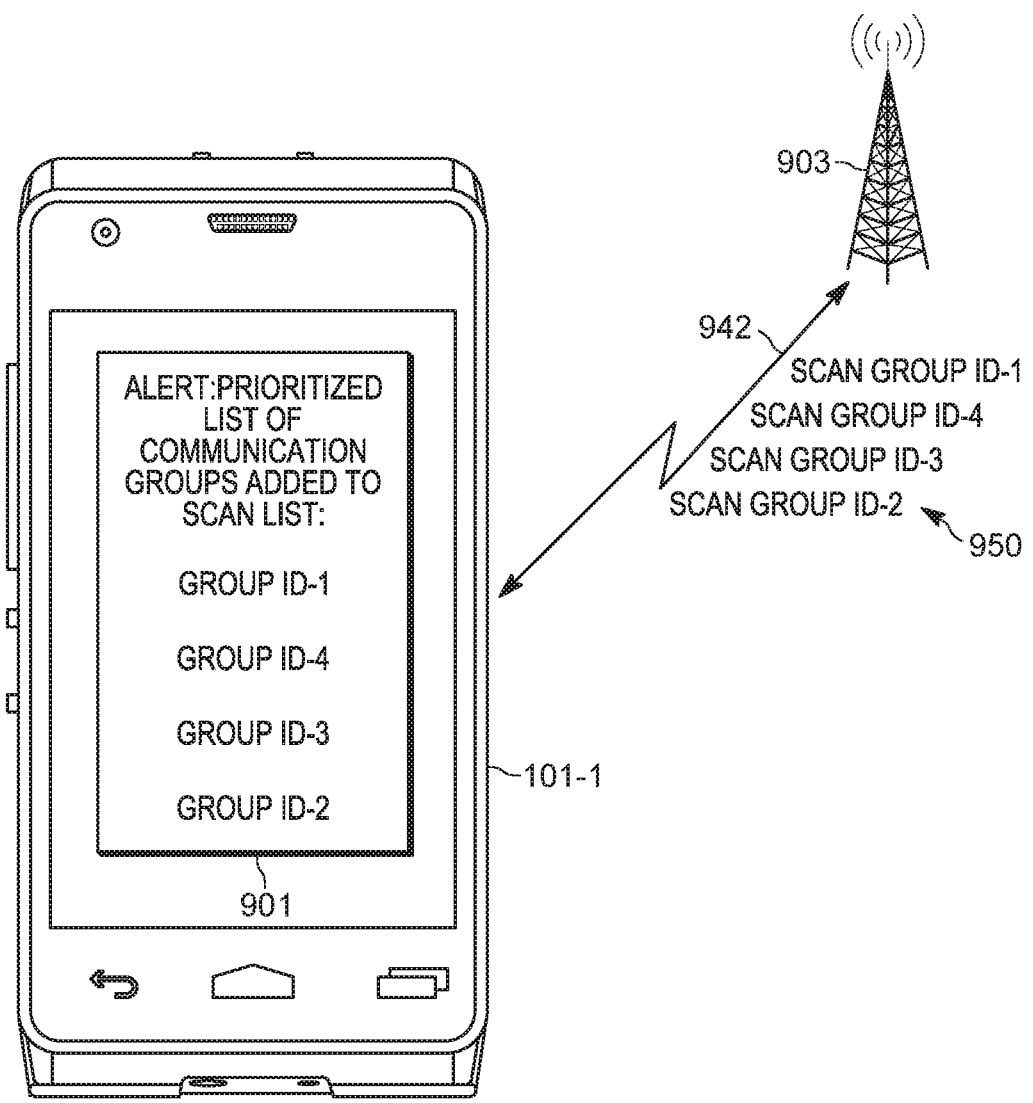
FIG. 9 depicts a communication device scanning a prioritized list of communication groups in accordance with some embodiments.

Attention is next directed to FIG. 9 which depicts an example of the block 606 of the method 600. In particular, FIG. 9 depicts a perspective view of an example communication device 101-1, which receives the prioritized list 780-1. In response, at the block 606 of the method 600 (e.g. and when the example communication device 101-1 is in the first mode), the example communication device 101-1 adds the communication groups in the prioritized list 780-1 to a scan list at the example communication device 101-1, for example to periodically scan each of the communication groups identified by the communication group identifiers in the prioritized list 780-1, using a respective communication unit (e.g. similar to the communication unit 302) of the communication device 101-1.

As depicted, the example communication device 101-1 may at least temporarily render, at a display screen, a graphic user interface (GUI) 901 indicating that the prioritized list 780-1 has been added to the scan list, along with the communication group identifiers of the prioritized list 780-1. For example, the GUI 901 may be rendered as a notification to a user of the example communication device 101-1 that the communication groups of the prioritized list 780-1 have been added to the scan list. However, in other examples, the GUI 901 may not be rendered.

Also depicted in FIG. 9 is a base station 903 of a site that the example communication device 101-1 is communicating with, for example via a wireless link 942 (e.g. similar to the links 142). Once the prioritized list 780-1 is added to the scan list, as depicted, the example communication device 101-1 scans each of the communication groups identified by the communication group identifiers in the prioritized list 780-1. Such scanning is represented in FIG. 9 by scan data 950, which may comprise data for the example communication device 101-1 to at least temporarily tuning to each of the communication groups identified by the communication group identifiers in the prioritized list 780-1 to determine whether any activity is occurring in a communication group. However, any type of communication group scanning is within the scope of the present specification.

Figure 10:
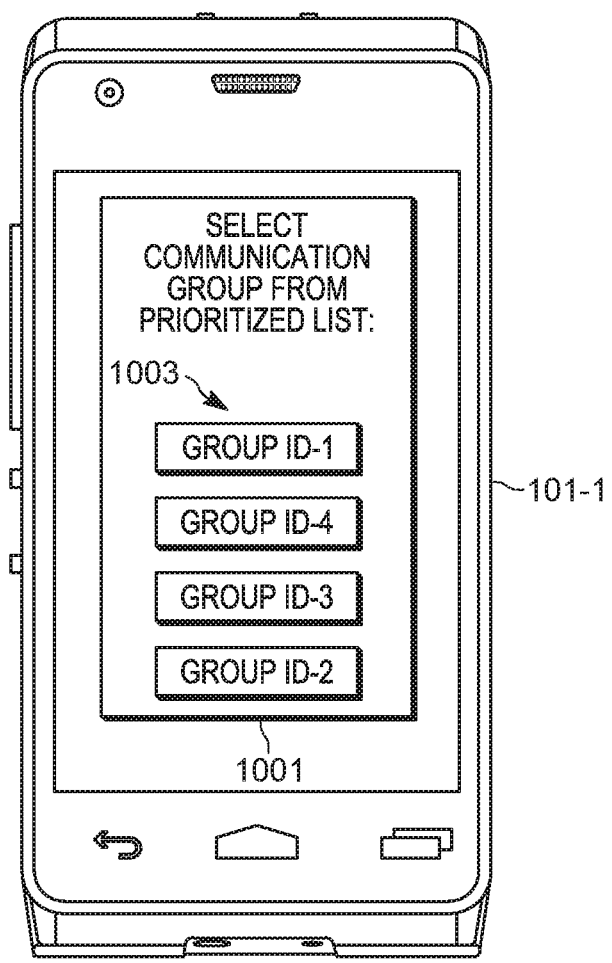
FIG. 10 depicts a communication device rendering a prioritized list of communication groups for selection in accordance with some embodiments.

Attention is next directed to FIG. 10 which depicts an example of the block 608 of the method 600. In particular, FIG. 10 depicts a perspective view of an example communication device 101-1, which receives the prioritized list 780-1. In response, at the block 608 of the method 600 (e.g. and when the example communication device 101-1 is in the second mode), the example communication device 101-1 renders the prioritized list 780-1, for example in a GUI 1001 at the display screen of the example communication device 101-1, for selection of a communication group of the plurality of communication groups in the prioritized list 780-1. For example, as depicted, each of the communication group identifiers in the prioritized list 780-1 is rendered as respective selectable options 1003, which, when selected, causes the example communication device 103-1 to change to the respective selected communication group. Furthermore, the respective selectable options 1003 may be rendered in an order of priority of the communication groups in the prioritized list 780-1. Hence, a first selectable option (e.g. from top to bottom in FIG. 10), of the selectable options 1003, labelled "GROUP ID-1" corresponds to the first communication group in the prioritized list 780-1; for example, the group identifiers in the prioritized list 780-1 may be used to label the selectable options 1003.

Figure 11:
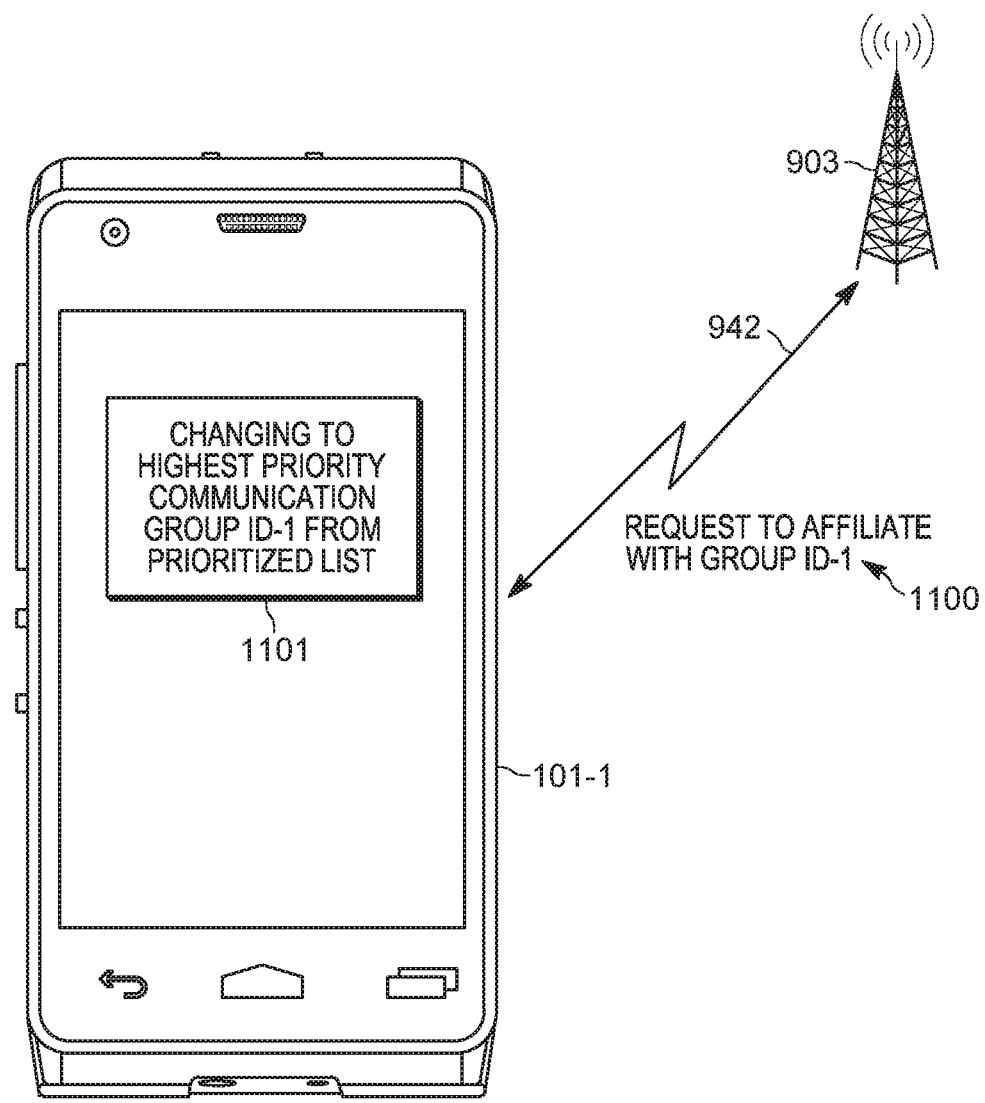
FIG. 11 depicts a communication device changing to a highest priority communication group in a prioritized list of communication groups in accordance with some embodiments.

Attention is next directed to FIG. 11 which depicts an example of the block 614 of the method 600. In particular, FIG. 11 depicts a perspective view of an example communication device 101-1, which receives the prioritized list 780-1. In response, at the block 614 of the method 600 (e.g. and when the example communication device 101-1 is in the third mode and the bandwidth of a current site, as represented by the link 942 to the base station 903, is available to communicate on the highest priority communication group), the example communication device 101-1 may change to (and/or request affiliation with) the highest priority communication group in the prioritized list 780-1, for example the communication group identified by the identifier "GROUP ID-1".

The change to the highest priority communication group in the prioritized list 780-1 is represented by a request 1100 to affiliate with the communication group identified by the identifier "GROUP ID-1", though scheme for changing to (and/or requesting affiliation with) the highest priority communication group in the prioritized list 780-1 is within the scope of the present specification.

As depicted, the example communication device 101-1 may optionally render a GUI 1101 to notify a user of the example communication device 101-1 that the example communication device 101-1 is changing to the highest priority communication group in the prioritized list 780-1.

Figure 12:
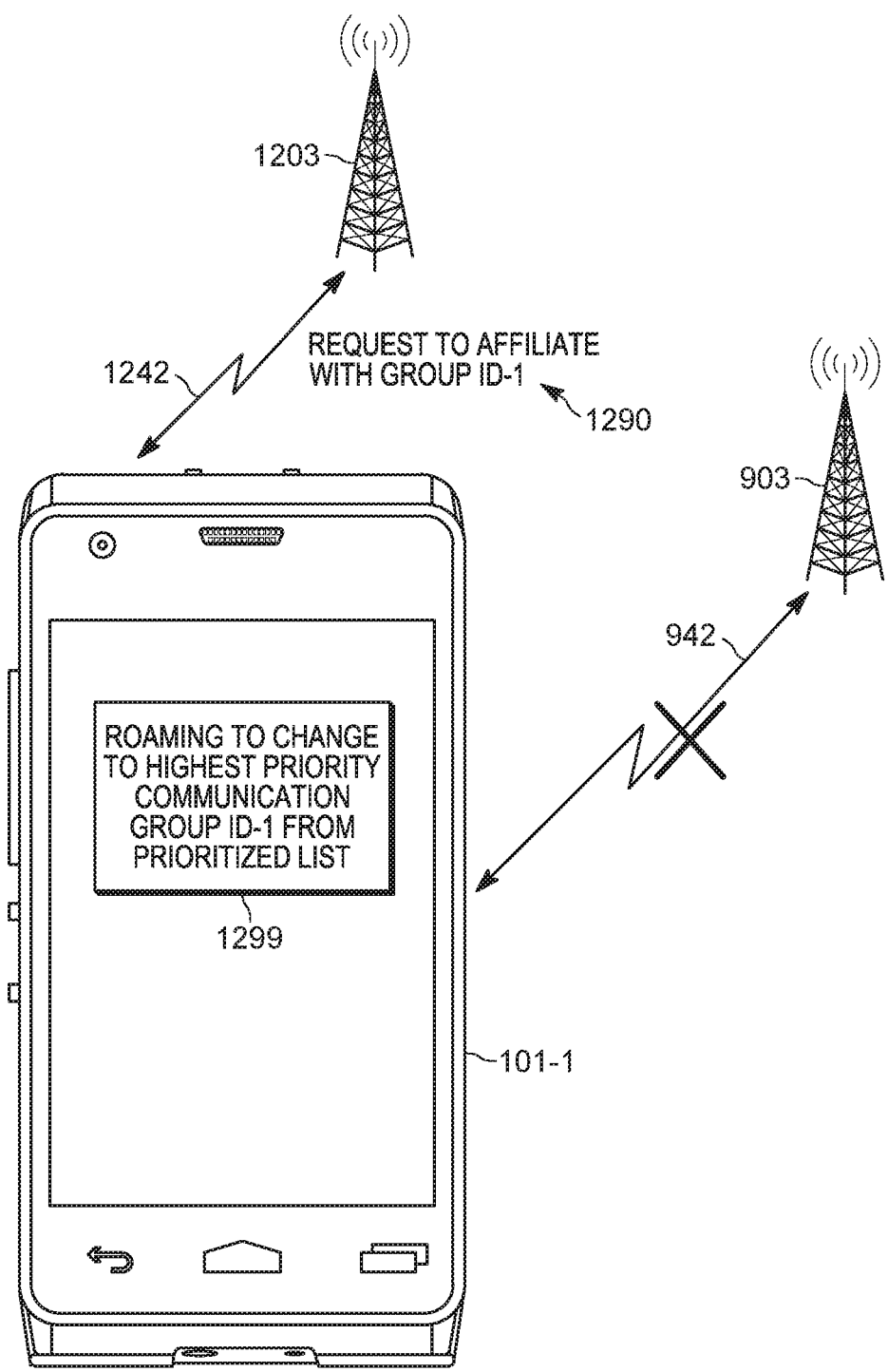
FIG. 12 depicts a communication device roaming to change to a highest priority communication group in a prioritized list of communication groups in accordance with some embodiments.

Attention is next directed to FIG. 12 which depicts an example of the block 612 of the method 600. In particular, FIG. 12 depicts a perspective view of an example communication device 101-1, which receives the prioritized list 780-1. In response, at the block 612 of the method 600 (e.g. and when the example communication device 101-1 is in the third mode and the bandwidth of a current site, as represented by the link 942 to the base station 903, is not available to communicate on the highest priority communication group), the example communication device 101-1 may roam to a site, as represented by a second base station 1203, with available bandwidth, as represented by the wireless link 1242, to change to the highest priority communication group in the prioritized list 780-1.

For example, the example communication device 101-1 may determine that the link 942 does not have sufficient bandwidth to communicate with highest priority communication group in the prioritized list 780-1, and query other base stations to determine available bandwidth thereof. A person of skill in the art understands that the base station 1203 may have bandwidth available to communicate with highest priority communication group in the prioritized list 780-1. The example communication device 101-1 may then stop communicating over the link 942 (as represented by the "X" therethrough), and start communicating over the link 1242 to change to (and/or request affiliation with) the highest priority communication group in the prioritized list 780-1 (e.g. at the block 614 of the method 600).

The change to the highest priority communication group in the prioritized list 780-1 is represented by a request 1290 to affiliate with the communication group identified by the identifier "GROUP ID-1", though any scheme for changing to (and/or requesting affiliation with) \ the highest priority communication group in the prioritized list 780-1 is within the scope of the present specification.

As depicted, the example communication device 101-1 may optionally render a GUI 1299 to notify a user of the example communication device 101-1 that the example communication device 101-1 is roaming to change to (and/or request affiliation with) the highest priority communication group in the prioritized list 780-1.

While the method 600 is described with reference to the example communication device 101-1 in FIG. 9 to FIG. 12, each of the communication devices 101 is understood by a person of skill in the art to implement the method 500 in a similar manner using respective received priority lists 780.

Figure 13:
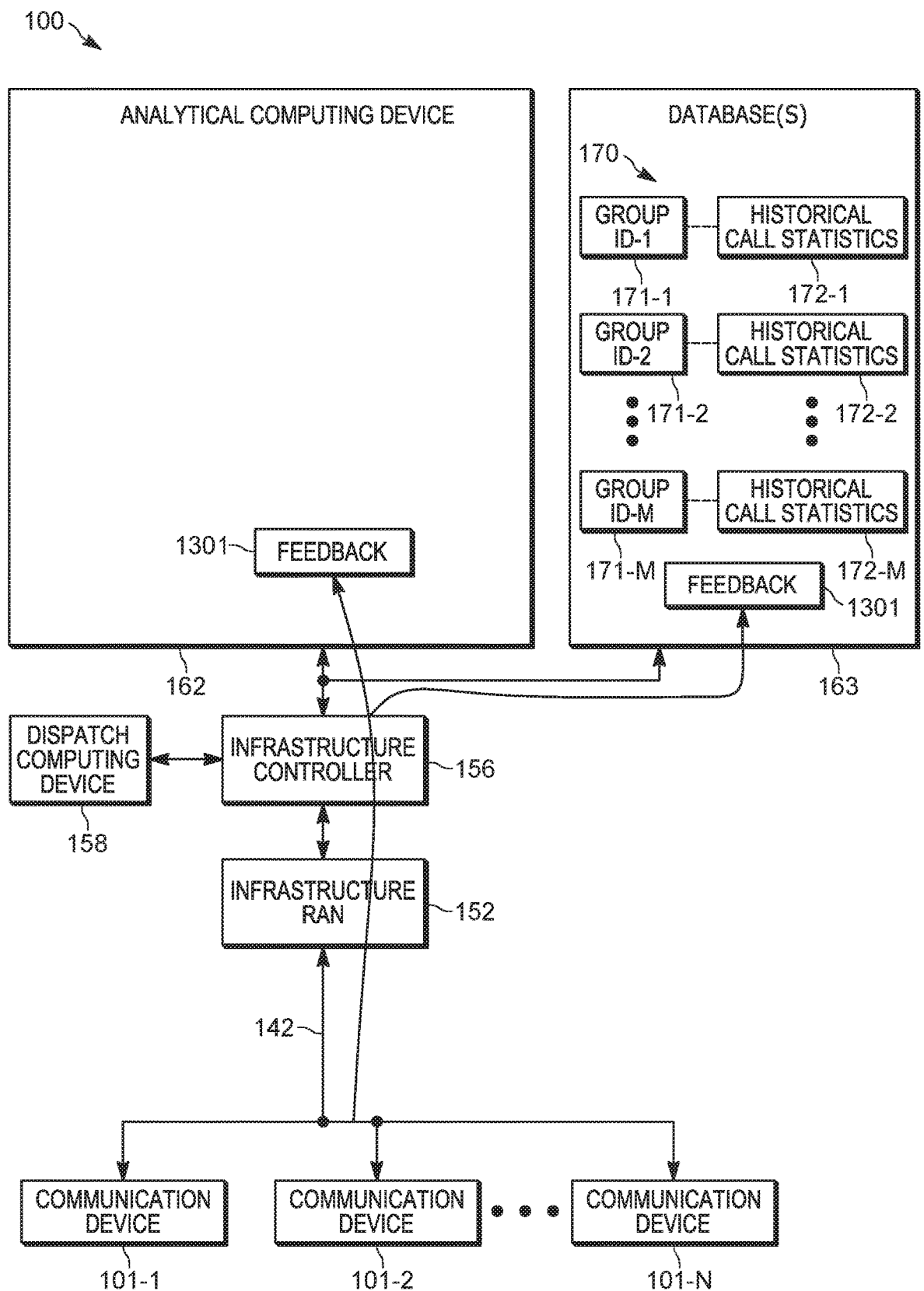
FIG. 13 depicts the communication devices the system of FIG. 1 providing feedback to the computing device that generated the respective prioritized lists of communication groups in accordance with some embodiments.

Attention is next directed to FIG. 13 which is substantially similar to FIG. 1 with like elements having like numbers. In FIG. 13, the communication devices 101 are providing feedback 1301 to the analytical computing device 162 (and/or the example computing device 401), the feedback 1301 used to provide feedback to the machine learning algorithms of the application 423 used to implement the method 500. For example, the scanning and/or the changing to the communication groups of the prioritized lists 780 may be provided to the machine learning algorithms to better "teach" the machine learning algorithms how to implement the method 600. Such feedback may be provided to the analytical computing device 162 (and/or the example computing device 401) as call statistics of the respective communication devices 101 that represent calls and/or data of the communication groups of the prioritized lists 780 (e.g. whether calls occurred on the communication groups of the prioritized lists 780, how long such calls lasted etc.).

As depicted, the feedback 1301 may be logged in a repository, such as the database 163, so that the feedback 1301 may be used as a source for providing feedback to machine learning algorithms in other computing devices implementing the method 500 (e.g. different from the analytical computing device 162 and/or the example computing device 401).

Provided herein is a device, system and method for determining a prioritized list of communication groups, which may be provided to a communication device to assist the communication device in determining which communication group to use during an incident, and the like. The prioritized list may hence prevent a user of the communication device from manually scanning through communication groups to find a communication group to use during an incident, which may reduce flooding of communication group affiliations.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:
1. A computing device comprising:
a communication unit configured to communicate with a communication device assigned to a plurality of communication groups; and
a controller communicatively coupled to the communication unit,
the controller having access to a memory storing: historical call statistics of the plurality of communication groups;
the controller configured to:
monitor current call statistics of the plurality of communication groups;
based on a comparison of the current call statistics with the historical call statistics, generate a prioritized list of the plurality of communication groups; and,
transmit, using the communication unit, to the communication device, the prioritized list, wherein the prioritized list of the plurality of communication groups is configured to automatically cause the communication device to roam to a site with available bandwidth to change to a highest priority communication group in the prioritized list, when bandwidth of a current site is unavailable to communicate on the highest priority communication group.
2. The computing device of claim 1, wherein statistics of both the current call statistics and the historical call statistics comprise one or more of:
a call arrival rate;
a Push-to-Talk Rate;
call duration;
Push-To-Talk duration;

numbers of respective sites active in each of the plurality of communication groups;
numbers of respective zones active in each of the plurality of communication groups;
numbers of respective systems active in each of the plurality of communication groups;
numbers of respective communication devices active in each of the plurality of communication groups;
proximity of the respective communication devices active in each of the plurality of communication groups;
priority of users of the respective communication devices active in each of the plurality of communication groups; and
role of users of the respective communication devices active in each of the plurality of communication groups.

3. The computing device of claim 1, wherein each of the plurality of communication groups comprise one or more of a talkgroup, a video group, and a text group.

4. The computing device of claim 1, wherein the controller is further configured to compare the current call statistics with the historical call statistics and generate the prioritized list of the plurality of communication groups using one or more machine learning algorithms.

5. The computing device of claim 4, wherein the controller is configured to provide feedback to the one or more machine learning algorithms.

6. The computing device of claim 1, wherein the prioritized list of the plurality of communication groups is configured to be added to a scan list at the communication device.

7. The computing device of claim 1, wherein the prioritized list of the plurality of communication groups is configured to automatically cause the communication device to change to a highest priority communication group in the prioritized list.

8. The computing device of claim 1, wherein the prioritized list of the plurality of communication groups is configured to automatically cause the communication device to render the prioritized list for selection of a communication group of the plurality of communication groups.

9. A method comprising:
monitoring, at a controller, current call statistics of a plurality of communication groups, a communication device assigned to the plurality of communication groups;
based on a comparison of the current call statistics with historical call statistics of the plurality of communication groups, generating, at the controller, a prioritized list of the plurality of communication groups; and,
transmitting, from the controller, using a communication unit, to the communication device, the prioritized list, wherein the prioritized list of the plurality of communication groups is configured to automatically cause the communication device to roam to a site with available bandwidth to change to a highest priority communication group in the prioritized list, when bandwidth of a current site is unavailable to communicate on the highest priority communication group.

10. The method of claim 9, wherein statistics of both the current call statistics and the historical call statistics comprise one or more of:
a call arrival rate;
a Push-to-Talk Rate;
call duration;
Push-To-Talk duration;
numbers of respective sites active in each of the plurality of communication groups;
numbers of respective zones active in each of the plurality of communication groups;
numbers of respective systems active in each of the plurality of communication groups;
numbers of respective communication devices active in each of the plurality of communication groups;
proximity of the respective communication devices active in each of the plurality of communication groups;
priority of users of the respective communication devices active in each of the plurality of communication groups; and
role of users of the respective communication devices active in each of the plurality of communication groups.

11. The method of claim 9, wherein each of the plurality of communication groups comprise one or more of a talkgroup, a video group, and a text group.

12. The method of claim 9, further comprising comparing the current call statistics with the historical call statistics and generating the prioritized list of the plurality of communication groups using one or more machine learning algorithms.

13. The method of claim 12, further comprising providing feedback to the one or more machine learning algorithms.

14. The method of claim 9, wherein the prioritized list of the plurality of communication groups is configured to be added to a scan list at the communication device.

15. The method of claim 9, wherein the prioritized list of the plurality of communication groups is configured to automatically cause the communication device to change to a highest priority communication group in the prioritized list.

16. The method of claim 9, wherein the prioritized list of the plurality of communication groups is configured to automatically cause the communication device to render the prioritized list for selection of a communication group of the plurality of communication groups.

17. A system comprising:
a computing device and a communication device configured to communicate with each other, the computing device configured to:
monitor current call statistics of a plurality of communication groups, the communication device assigned to the plurality of communication groups;
based on a comparison of the current call statistics with historical call statistics of the plurality of communication groups, generate a prioritized list of the plurality of communication groups; and,
transmit, to the communication device, the prioritized list, and
the communication device configured to:
receive the prioritized list; and;
and
roam to a site with available bandwidth to change to the highest priority communication group in the prioritized list, when bandwidth of a current site is unavailable to communicate on the highest priority communication group.

18. The system of claim 17, wherein statistics of both the current call statistics and the historical call statistics comprise one or more of:
a call arrival rate;
a Push-to-Talk Rate;
call duration;
Push-To-Talk duration;

numbers of respective sites active in each of the plurality of communication groups;
numbers of respective zones active in each of the plurality of communication groups;
numbers of respective systems active in each of the plurality of communication groups;
numbers of respective communication devices active in each of the plurality of communication groups;
proximity of the respective communication devices active in each of the plurality of communication groups;
priority of users of the respective communication devices active in each of the plurality of communication groups; and
role of users of the respective communication devices active in each of the plurality of communication groups.

\* \* \* \* \*